Aug. 29, 1950     C. M. OSTERHELD     2,520,774
ELECTRIC IRON
Filed Aug. 27, 1945
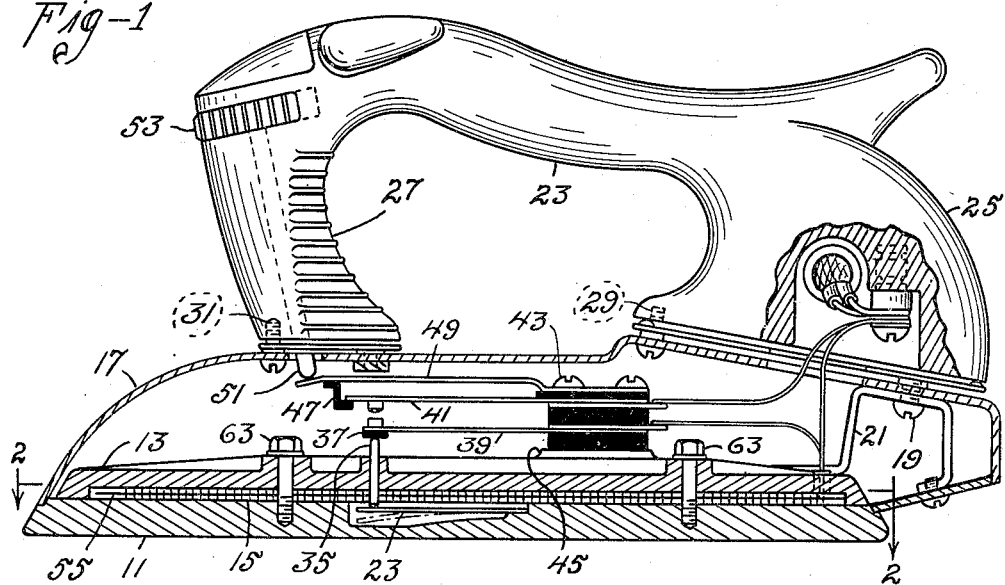
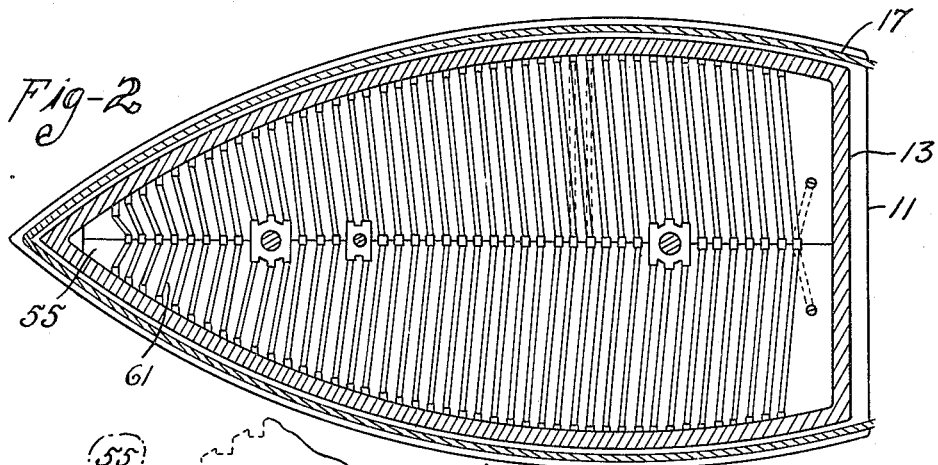
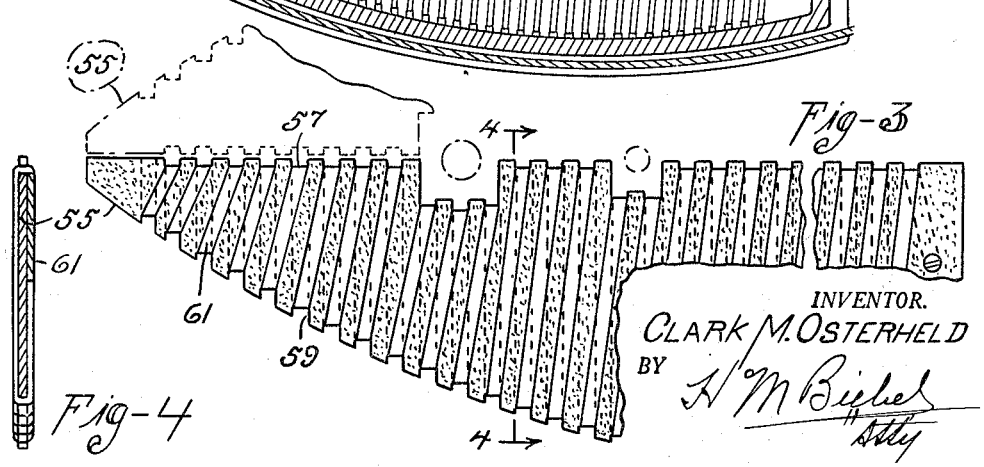
INVENTOR.
CLARK M. OSTERHELD Patented Aug. 29, 1950

2,520,774

UNITED STATES PATENT OFFICE 2,520,774

ELECTRIC IRON

Clark M. Osterheld, Stoughton, Wis., assignor to McGraw Electric Company, Elgin, Ill., a corporation of Delaware Application August 27, 1945, Serial No. 612,888

2 Claims. (Cl. 219—25)

My invention relates to sadirons and particularly to electric sadirons.

An object of my invention is to provide a relatively simply structure for an electrically heated sadiron.

Another object of my invention is to provide a novel means for insulating the heating element of an electric iron from the soleplate and the top plate.

Another object of my invention is to provide a heating element for an electric sadiron that shall reduce the temperature differential between the heating element and the ironing surface of the soleplate.

Other objects of my invention will either become apparent during the course of a description of one form of device embodying my invention or will be pointed out in the course of such description and set forth in the appended claims.

In the drawings,

Figure 1 is a side view of an iron, partially in section and partially in elevation, Fig. 2 is a horizontal sectional view taken on the line 2—2 of Fig. 1, Fig. 3 is an enlarged fragmentary plan view of a half portion of the heating element, and, Fig. 4 is a lateral, sectional view taken on the line 4—4 of Fig. 3.

Referring first of all to Fig. 1 of the drawings, I have there shown an electric sadiron comprising a soleplate 11, a top plate 13, and a heating element 15 positioned between the top plate and soleplate. I have shown also a casing 17 which may be held in proper operative position relatively to the heated body comprising the soleplate 11, the top or clamping plate 13 and the heating element 15. I have shown the casing secured in proper operative position as by one or more short machine screws 19 which hold the casing against a rear bracket 21 which may be secured against the upper surface of the top plate.

I provide a handle 23 having a rear handle support 25 and a front handle support 27. The handle may be held against the casing 17 as by a short machine screw 29 which extends through the rear portion of the casing 17 and into the rear handle support 25. The front end of the handle is held by one or more short machine screws 31 extending through the casing 17 and into the front handle support 27.

Means for controlling the energization of the heating element 15 may comprise a bimetal bar 33 which has one of its ends secured against the upper surface of a recess in the soleplate 11, the bimetal bar 33 being adapted to flex in a counter-clockwise direction upon increase of temperature. An actuating rod 35 is adapted to rest upon the free end of bimetal bar 33 and is adapted to engage a small block 37 of electric insulating material secured against the lower surface of a lower contact arm 39. A second upper contact arm 41 is positioned above the first contact arm 39, the two contact arms being adapted to be secured as by a pair of relatively heavy short machine screws 43 which have screw-threaded engagement with a block 45, the lower end portion of which is in engagement with, preferably, the soleplate itself.

The contact arms 39 and 41 are biased in a counter-clockwise direction and means for adjusting the position of the upper contact arm 41 includes a member 47 of electric-insulating material, secured to a spring arm 49 biased in a clockwise direction, which spring arm is adapted to be positioned by a rod 51 which rod extends through the front handle support 27 and may be adjusted as by a wheel 53 positioned in a recess in the upper front end portion of handle 23.

I desire to point out here that while I have shown and described details of a switch, a casing and a handle, these parts constitute no part of my present invention.

The heating element comprises a pair of relatively thin strips 55 which are made of metal preferably of aluminum. The thickness of each of the two sheets 55 is on the order of .015 inch and the entire outer surface of each of the sheets 55 is covered with an integral, inorganic, high temperature-resisting, heat-conducting and electric-insulating coating the thickness of which is less than .002 inch. Reference may be had to Patent No. 1,526,127 for one method of making such coatings usually termed "anodic" coatings.

Each of the two strips or sheets 55 is provided with a plurality of recesses 57 at its inner edge and with a plurality of recesses 59 over its outer edge, a resistor member 61 of metal being wound in said recess. While I may use any of the resistor strips now in use, I may also use aluminum strip.

I may provide an inorganic, integral, high-temperature-resisting, heat-conducting, and electric-insulating coating over the entire outer surface of the resistor member 61, this coating having a thickness of less than .002 inch and being of the anodic kind.

While I may provide an anodic coating of the kind hereinbefore set forth on the metallic member only, I do not desire to be limited thereto since I may provide such anodic coating over the entire surface of the resistor-supporting strips 55. Then, further, I may provide the upper surface of the soleplate 11 with such an anodic coating of the same kind as hereinbefore described.

The top plate may be clamped in tight or close engagement with the soleplate 11 as by a plurality of short bolts 63 extending therethrough and into the soleplate.

While I have shown a top or clamping plate 13 which has a recess in its lower surface, I do not desire to be limited thereto but if such recess is used, its depth must be less than that of the total thickness of the heating element as shown in Fig. 4 of the drawings so that the heating element will be clamped tight to soleplate to provide a good heat flow path therebetween.

Tests have shown that when a relatively thin soleplate is provided made, for instance, of brass or copper and a heating element of the general kind hereinbefore set forth is used therewith there will be a temperature differential between the temperature of the resistor strip and that of the lower ironing surface of the soleplate which will be on the order of not over 400° F.

While I preferably make the soleplate of brass or copper, I preferably make the top plate of a material having a relatively high thermal reluctance such as stainless steel or of Mycalex which is a mixture of mica and glass.

Various modifications of the system embodying my invention may be made without departing from the spirit and scope thereof and all such modifications coming clearly within the scope of the appended claims, shall be considered a part of my invention.

I claim as my invention:

1. An electric sadiron comprising a metallic sole plate, a metallic top clamping plate rigidly secured to the sole plate, a flat supporting sheet interposed between said plates, a heat-generating aluminum ribbon resistor wound on said supporting sheet with upper and lower flat layers of the resistor located on opposite sides of said sheet, said resistor having on its entire surface a thin, integral, heat-conducting and electric-insulating anodic coating, the lower layer of the resistor being clamped by the clamping plate in tight contact with the upper side of the sole plate.

2. An electric sadiron comprising a metallic sole plate, a metallic top clamping plate rigidly secured to the sole plate, a flat heat-conducting aluminum supporting sheet interposed between said plates having on its entire surface a thin integral, heat-conducting and electric-insulating coating, a heat-generating aluminum ribbon resistor wound on said supporting sheet with upper and lower flat layers of the resistor located on opposite sides of the sheet, said resistor having on its entire surface a thin, integral, heat-conducting and electric-insulating anodic coating, the lower layer of the resistor being clamped by the clamping plate in tight contact with the upper side of the sole plate.

CLARK M. OSTERHELD.

REFERENCES CITED

The following references are of record in the file of this patent:

UNITED STATES PATENTS

| Number | Name | Date |
|---|---|---|
| 1,117,240 | Presser | Nov. 17, 1914 |
| 1,583,460 | Hansson | May 4, 1925 |
| 1,874,542 | Kaul | Aug. 30, 1932 |
| 2,124,984 | McCullough | Mar. 28, 1936 |
| 2,228,101 | Willmann | Feb. 12, 1938 |
| 2,274,390 | Weeks | June 17, 1941 |

FOREIGN PATENTS

| Number | Country | Date |
|---|---|---|
| 15,896 | Great Britain | of 1909 |